United States Patent Office 3,787,480
Patented Jan. 22, 1974

3,787,480
METHOD OF SEPARATING UNREACTED TEREPHTHALIC ACID
Yataro Ichikawa, Michiyuki Tokashiki, and Osamu Kobayashi, Iwakuni, Japan, assignors to Teijin Limited, Osaka, Japan
No Drawing. Filed Nov. 2, 1971, Ser. No. 195,033
Claims priority, application Japan, Nov. 4, 1970, 45/96,409; Nov. 9, 1970, 45/98,416
Int. Cl. C07c 69/82
U.S. Cl. 260—475 PR                8 Claims

ABSTRACT OF THE DISCLOSURE

A method of separating unreacted terephthalic acid from a reaction mixture containing bis-($\beta$-hydroxyethyl) terephthalate obtained by the ethylene oxide process which comprises treating the reaction mixture to form a suspension containing molten bis-($\beta$-hydroxyethyl) terephthalate heated at 85° C. to 180° C. and solid unreacted terephthalic acid, in which suspension (a) The content of unreacted ethylene oxide is less than 2% by weight based on the bis-($\beta$-hydroxyethyl) terephthalate, and (b) The content of an inert organic liquid medium in the suspension is 1–100% by weight based on the bis-($\beta$-hydroxyethyl) terephthalate; and separating the unreacted terephthalic acid from this suspension. The recovery of the unreacted terephthalic acid is almost 100%.

---

This invention relates to a process for separating unreacted terephthalic acid from a reaction mixture which is obtained in the production of bis-($\beta$-hydroxyethyl) terephthalate by reaction of terephthalic acid with ethylene oxide.

Bis-($\beta$-hydroxyethyl) terephthalate (to be referred to as BHET) is commercially very important as an intermediate for the production of polyesters that can be shaped into fibers, films, and other articles. Previously, the commercial production of BHET has been performed by the ester-interchange reaction between dimethyl terephthalate and ethylene glycol or the direct esterification reaction between terephthalic acid and ethylene glycol. Recently, the ethylene oxide method whereby BHET is produced by reacting terephthalic acid with ethylene oxide (to be referred to as EO) has attracted attention.

If substantially all of the terephthalic acid is reacted with EO to produce BHET in the ethylene oxide method, it is not necessary to separate and recycle unreacted terephthalic acid and this is economical. However, in the reaction of terephthalic acid with ethylene oxide, an attempt to operate the reaction with the conversion of terephthalic acid being maintained at almost the theoretical value results in various undesirable phenomena such as the formation of oligomers of BHET and diethylene glycol, or the coloration of the resulting BHET.

The formation of oligomers of BHET complicates the operation in the subsequent step of purifying BHET and therefore reduces the yields of BHET. Diethylene glycol formed as a by-product is difficult to separate from BHET, and if BHET containing diethylene glycol is used as a material for production of polyesters, the resulting polyesters will have a lowered softening point. The coloration of BHET is undesirable in the production of polyesters.

If the conversion of terephthalic acid is maintained below a certain level, for example, below 98%, preferably below 95%, in the production of BHET by reaction of terephthalic acid with ethylene oxide, side-reactions which cause the undesirable phenomena mentioned above, such as the formation of the oligomers and diethylene glycol and the coloration of BHET, can be prevented to a considerable extent.

The separation of unreacted terephthalic acid from the reaction mixture obtained by the above reaction which has been conducted with the specific conversion of terephthalic acid maintained as mentioned above is performed by solid-liquid separation in which solid unreacted terephthalic acid is separated from liquid BHET. If the separation of the unreacted terephthalic acid from BHET is not sufficient, terephthalic acid separated as a solid contains a great quantity of liquid BHET. If such terephthalic acid is recycled to the reaction system, oligomerization of BHET or the formation of diethylene glycol by reaction of BHET with ethylene oxide occurs in the reaction system. Consequently, the resulting product contains great quantities of impurities, such as oligomers of BHET or diethylene glycol.

If, on the contrary, the solid-liquid separation is effected so as to reduce the amount of BHET contained in the unreacted terephthalic acid, a great amount of unreacted terephthalic acid leaks out into the BHET filtrate, and another separate step is needed to remove terephthalic acid. Furthermore, BHET containing such unreacted terephthalic acid becomes the cause of scales formed in the piping or machinery due to terephthalic acid in a later step, for example the purification step.

Various problems as given below will arise in the continuous separation of BHET from unreacted terephthalic acid on a commercial scale.

(a) Heating is necessary to liquefy BHET. If heating is insufficient in the separator, BHET may solidify.

(b) Excessive heating in an attempt to remove such defects will result in overheating of BHET locally in the separator and therefore in such undesirable phenomena as the oligomerization of BHET, the formation of diethylene glycol, or the coloration of BHET.

(c) Since BHET in the molten state has a relatively high viscosity, the separation of it by a filter requires high filtering pressure or the use of a filter of a large filtration area. This is commercially disadvantageous.

(d) If the separation is effected using a centrifugal separator, it is necessary to use a centrifugal separator of large size and high centrifugation effect. This is not economical.

(e) Generally, the viscosity of a liquid can be reduced by elevating its temperature. Elevating the heating temperature for BHET will result in the oligomerization of BHET, the formation of diethylene glycol, the coloration of BHET, and other troubles.

Accordingly, the effective separation of unreacted terephthalic acid from BHET in the reaction mixture resulting from the reaction of terephthalic acid with ethylene oxide is a very important problem as far as the commercial practice of the method is concerned.

A primary object of the invention is to provide a method of separating terephthalic acid from the reaction mixture containing BHET obtained by reaction of terephthalic acid with ethylene oxide.

A second object of the present invention is to provide a method of easily separating and recovering BHET substantially free from unreacted terephthalic acid or BHET containing very little unreacted terephthalic acid and a small content of oligomers of BHET including a dimer and those having a higher degree of polymerization.

Another object of the present invention is to provide a method of separating substantially all of the unreacted terephthalic acid contained in the reaction mixture, and readily recovering good quality BHET having a reduced content of BHET oligomers including a dimer and those having a higher degree of polymerization, a reduced diethylene glycol content, and little coloration.

Still another object of the present invention is to provide a method of separating unreacted terephthalic acid from the reaction mixture with a reduced amount of heat consumed and a high treating ability per unit equipment.

Other objects and advantages of the present invention will become apparent from the following description.

According to the present invention, the above objects and advantages can be achieved by a method which comprises treating a reaction mixture containing bis-($\beta$-hydroxyethyl) terephthalate, which mixture has been obtained by reacting terephthalic acid with ethylene oxide to form a suspension containing molten bis-($\beta$-hydroxyethyl) terephthalate heated at a temperature of from 85° C. to 180° C. and solid unreacted terephthalic acid in which suspension (a) The content of unreacted ethylene oxide is less than 2% by weight based on the bis-($\beta$-hydroxyethyl) terephthalate, and
(b) The content of an inert organic liquid medium is 1–100% by weight based on the bis-(-$\beta$-hydroxyethyl) terephthalate;

and separating unreacted terephthalic acid from this suspension.

The invention will be described in greater detail below.

REACTION MIXTURE TO WHICH THE PRESENT INVENTION IS APPLIED

The BHET-containing reaction mixture to which the method of the present invention is to be applied may be any reaction mixture containing bis($\beta$-hydroxyethyl) terephthalate obtained by the reaction of terephthalic acid with ethylene oxide. As previously mentioned, the reaction of terephthalic acid with ethylene oxide to form bis-($\beta$-hydroxyethyl) terephthalate is called the ethylene oxide process. Therefore, the BHET-containing reaction mixture produced by the ethylene oxide process can be used in the present invention.

Various catalysts shown below can be used for the production of bis($\beta$-hydroxyethyl) terephthalate by reaction of terephthalic acid with ethylene oxide.

(1) Amines (a) Primary amines, for example, methylamine, ethylamine, isopropylamine, cyclohexylamine, ethanolamine, aniline, etc. (disclosed in British Pat. No. 1,083,921).

(b) Secondary amines, for example, dimethylamine, diethylamine, di-n-butylamine, diethanolamine, N-methylethanolamine, N-methyl-$\beta$-cyanoethylamine, piperidine, morpholine, diphenylamine, N - ethyl-m-toluidine, etc. (disclosed in British Pat. No. 1,083,921).

(c) Tertiary amines, for example, trimethylamine, triethylamine, tripropylamine, dimethylethanolamine, diethylethanolamine, N-methyl-morpholine, pyridine, picoline, N,N'-dimethylaniline, triethanolamine, tribenzylamine, etc. (disclosed in British Pats. 1,029,669 and 1,083,921 and U.S. Pat. No. 3,037,049).

(2) Amine salts

Halogenated hydroacid salts, organic carboxylates, inorganic acid salts such as carbonates, perchlorides, nitrates, etc. of the amines as in (1)–(a), (b) and (c) above (disclosed in U.S. Pat. No. 2,910,490, British Pat. No. 1,083,921).

(3) Quaternary ammonium salts

Tetramethylammonium-chloride, -bromide, and -iodide; tetraethylammonium-chloride, -bromide, and -iodide; methyl triethylammonium fluoride; trimethyl phenylammonium-chloride and bromide; triethyl benzylammonium chloride, etc. (disclosed in U.S. Pat. No. 2,910,490, British Pat. No. 1,083,921).

(4) Quaternary ammonium hydroxides

Tetramethyl ammonium hydroxide, tetraethylammonium hydroxide, methyl triethylammonium hydroxide, triethyl benzylammonium hydroxide, trimethyl phenylammonium hydroxide, etc.

(5) Phosphines and phosphonium salts

Triphenylphosphine, triethylphosphine, tripropylphosphine, tributylphosphine, diethyl phenylphosphine, triethyl benzylphosphonium bromide, etc. (disclosed in British Pat. No. 1,077,914, Dutch Pat. No. 6601077, British Pat. No. 1,083,921).

(6) Thioethers and sulfonium salts

Diethyl sulfide, di-n-propyl sulfide, di-n-butyl sulfide, divinyl sulfide, diphenyl sulfide, thiodiglycol, methionine, trithioformaldehyde, dibenzyl sulfide, thioglycolic acid, 2-mercaptoethanol, laurylmercaptane (disclosed in Japanese Official Patent Gazette, Publication No. 24,577/1968), diethylmethylsulfonium iodide, trimethylsulfonium iodide, dibenzylmethylsulfonium iodide, di-n-butylbenzylsulfonium chloride, tribenzylsulfonium chloride, trimethylsulfonium formate, tris($\beta$-hydroxyethyl) sulfonium terephthalate, trimethylsulfonium hydroxide (disclosed in Japanese Official Patent Gazette, Publication No. 26,624/67).

(7) Compounds intermolecularly containing nitrogen and sulfur 1,3-dimethylthiourea, 2-mercaptobenzothiazole, tetramethylthiuram, monosulfide, etc.

(8) Arsine and arsonium salts

Triphenylarsine, triethylarsine, etc. (disclosed in Dutch Pat. No. 6601077).

(9) Stibine and stibonium salts

Triethylstibine, triphenylstibine, etc. (disclosed in Dutch Pat. No. 6601077).

Among the foregoing known catalysts, the secondary amines of (1)(b), tertiary amines of (1)(c), salts thereof, quaternary ammonium salts of (3), quaternary ammonium hydroxides of (4), phosphines of (5), and thioethers of (6) are particularly suitable.

These known catalyst compounds which further contain hydroxyl or carboxyl groups can also be used. Examples of such compounds are glutamic acid, aminocaproic acid, alanine, leucine, and aspartic acid.

Using a catalyst such as exemplified above, bis-($\beta$-hydroxyethyl) terephthalate can be produced by reacting terephthalic acid with ethylene oxide in the presence or absence of an inert organic liquid medium.

Examples of the inert organic liquid medium include:

(1) Halogenated hydrocarbons

Chlorinated hydrocarbons such as methylene chloride, chloroform, carbon tetrachloride, dichloroethane, trichloroethane, tetrachloroethane, chlorobenzene, dichlorobenzene, etc.

Brominated hydrocarbons such as bromoform, dibromoethane, bromobenzene, etc.

Fluorinated hydrocarbons such as fluorobenzene, $\alpha,\alpha'$, $\alpha''$-trifluorotoluene, fluoroethane, dichloride, etc. (disclosed in British Pat. No. 1,029,669).

(2) Ketones

Acetone, methyl ethyl ketone, methyl isopropyl ketone, diethyl ketone, cyclohexanone, methyl isobutyl ketone, 4-methyl-2-pentanone, etc. (disclosed in U.S. Pat. No. 3,037,049).

(3) Ethers

Diethyl ether, diisopropyl ether; dibutyl ether, tetrahydrofuran, dioxane, etc. (disclosed in U.S. Pats. Nos. 3,037,049 and 2,862,957, and British Pat. No. 1,077,914).

(4) Mono-, di-, and poly-hydric alcohols

Methanol, ethanol, propanol, isopropanol, butanol, pentanol, ethylene, glycol, propylene glycol, bis-(β-hydroxyalkyl) esters of the aromatic carboxylic acids (disclosed in British Pat. No. 851,029, U.S. Pat. No. 2,922,779, British Pat. No. 1,074,274 and South African Pat. No. 68/85).

(5) Amides

N,N - dimethylformamide, N,N - dimethylacetamide, N,N - tetramethyleneformamide, N,N,N',N'-tetramethylurea, hexamethylphosphoramide, N-alkylpyrrolidone, etc. (disclosed in U.S. Pat. No. 2,901,505).

(6) Esters

Alkyl esters of organic carboxylic acids: methyl acetate, ethyl acetate, butyl acetate, methyl propionate, ethyl propionate, butyl propionate, methyl benzoate, ethyl benzoate, methyl phthalate, etc. and cyclic esters such as γ-butyrolactone, ε-caprolactone, etc. (disclosed in British Pat. No. 1,029,669).

(7) Organic cyanides

Acetonitrile, propionitrile, butyronitrile, benzonitrile, succinonitrile, adiponitrile, etc. (disclosed in British Pat. No. 1,077,269).

(8) Hydrocarbons (a) Alphatic hydrocarbons which are liquid under the reaction conditions, and mainly aliphatic hydrocarbons of four or more carbons: butane, pentane, hexane, heptane, octane, nonane, decane, etc.

(b) Alicyclic hydrocarbons: Cyclopentane, methylcylopentane, cyclohexane, methyl-, ethyl-, or iso-propylcyclohexane, cyclooctane, cyclooctadiene, cyclododecatriene, etc.

(c) Aromatic hydrocarbons: Benzene, toluene, ethylbenzene, isopropylbenzene, o-xylene, m-xylene, p-xylene, diethyl benzene, methyl naphthalene, dimethyl naphthalene, ethyl naphthalene, etc. (disclosed in U.S. Pat. No. 3,037,049, British Pat. No. 1,077,914, U.S. Pat. No. 2,862,957).

Generally, in the reaction of terephthalic acid with ethylene oxide to produce BHET by the ethylene oxide process using an organic liquid medium, 1.5–4 moles, preferably 1.8–2.4 moles, of ethylene oxide are used per mole of terephthalic acid. But when an organic liquid medium is not used, the amount of ethylene oxide may be greater than the upper limit of the above-specified range. The feeding of ethylene oxide to the reaction system may be performed in the form of liquid or gas under cooling or under pressure.

The above-mentioned catalysts may be used individually or in combination, and the amount of the catalyst is preferably 0.01 to 20%, especially 0.05–10%, based on the weight of terephthalic acid.

The reaction of terephthalic acid with ethylene oxide is usually performed at 90–230° C., preferably 100–200° C. The suitable reaction pressure is normal atmospheric pressure to 50 atmospheres. It is especially preferred to set the above temperature and pressure conditions so that at least a portion of ethylene is maintained liquid in the reaction system.

The prescription of the conversion of terephthalic acid is very important for obtaining bis-(β-hydroxyethyl) terephthalate of good quality by reacting terephthalic acid with ethylene oxide under the above-mentioned conditions. Commercially, higher conversions of terephthalic acid are preferred, but too high conversions inevitably result in marked coloration or oligomerization of bis-(β-hydroxyethyl) terephthalate. Therefore, it is usually desirable that the conversion of terephthalic acid be maintained below 98%, preferably below 95%, and at least 2%, preferably at least 5%, of terephthalic acid fed remains unreacted at the time of discharging the reaction product from the reaction zone. On the other hand, too low conversions of terephthalic acid are commercially disadvantageous, and the lower limit of the conversion is usually 35%, preferably 50%.

The method of the present invention can be applied to any reaction mixture formed as a result of producing bis-(β-hydroxyethyl) terephthalate by the ethylene oxide process. Therefore, the above reaction mixture will be referred to as a feed reaction mixture, for the sake of convenience.

METHOD OF THE PRESENT INVENTION

(1) Preliminary treatment

Since the ethylene oxide process is usually performed at 90–230° C., preferably 100–200° C. as mentioned above, the reaction mixture obtained is at such a temperature. At these temperatures, BHET usually takes a molten state, and unreacted terephthalic acid is maintained solid. Furthermore, the reaction mixture contains considerably large quantities of unreacted ethylene oxide and an inert organic liquid medium or large quantities of ethylene oxide used as a reaction agent and a solvent, and also contains a catalyst or catalyst derivative.

The term "catalyst derivative" means a reaction product of the catalyst which may be formed by modification or derivation in the BHET-forming reaction system according to the ethylene oxide process.

According to the method of the present invention, such feed reaction mixture is pre-treated to form a suspension containing molten bis-(β-hydroxyethyl) terephthalate and heated at 85–180° C., preferably 90–150° C., in which suspension (a) the content of unreacted ethylene oxide is less than 2% by weight, preferably less than 1.5% by weight, based on the weight of bis(β-hydroxyethyl) terephthalate, and (b) the content of the inert organic liquid medium is 1–100% by weight, preferably 2–50% by weight, based on the bis(β-hydroxyethyl) terephthalate.

Thus, according to the present invention, the content of the unreacted ethylene oxide content in the feed reaction mixture is adjusted to less than 2% by weight of the BHET and the content of the inert organic liquid is also controlled by the above-mentioned procedure, thereby forming a liquid composition of an amount such that (i) the content of the liquid medium is not less than 1% by weight, preferably not less than 2% by weight, but (ii) a solution phase consisting mainly of the liquid medium and being separate from the molten BHET phase at a temperature of 85–180° C., preferably 90–150° C. as specified in the present invention is not substantially formed.

Such liquid composition is a suspension of the solid unreacted terephthalic acid in the molten BHET phase containing the medium. In the present invention, this suspension is formed by the above-described pre-treatment, and the unreacted terephthalic acid is separated from the suspension by any desired solid-liquid separating method.

If the above reaction mixture contains the liquid medium in an amount larger than that mentioned in (ii) above, a solution phase of the liquid medium which contains a part of the BHET in a dissolved state may be formed independently of the molten BHET phase, according to the type of liquid medium. This results in extreme obstruction of separating solid unreacted terephthalic acid with good efficiency.

The BHET-containing reaction mixture obtained by the ethylene oxide process generally contains considerably large amounts of unreacted ethylene oxide, and therefore, in order to adjust the ethylene oxide concentration to the value specified in (a) above, it is necessary to drive off unreacted ethylene oxide evaporated from the reaction mixture.

The concentration of the inert organic liquid medium is adjusted to the value specified in (b) above by removing a part of the inert organic liquid medium evaporated where the medium is used in great quantities in the practice of the ethylene oxide process; or by adding a predetermined amount of the medium when it is not used.

It is of course possible to perform the ethylene oxide process after prescribing the conditions such that the concentrations of unreacted ethylene oxide and the inert organic liquid medium in the resulting BHET-containing reaction mixture will be as specified in (a) and (b) above. This, however, requires increased conversions in the reaction between terephthalic acid and ethylene oxide, which in turn causes oligomerization of bis-($\beta$-hydroxyethyl) terephthalate or the formation of diethylene glycol. As a result, the quality of the resulting bis-($\beta$-hydroxyethyl) terephthalate is worsened, and it becomes difficult to separate unreacted terephthalic acid. As a result, bis-($\beta$-hydroxyethyl) terephthalate of good quality can be obtained by adjusting the concentration of ethylene oxide in the reaction mixture obtained by the ethylene oxide process by driving off a part of most of the unreacted ethylene oxide evaporated therefrom.

The preferred method of adjusting the concentrations of the unreacted ethylene oxide and inert organic liquid medium of the feed reaction mixture to those specified in (a) and (b) above comprises flushing the heated reaction mixture obtained by the ethylene oxide process into a receptable maintained at a temperature higher than a point at which BHET remains molten, if desired repeating the flushing operation and removing volatile matter which consists mainly of the organic liquid medium and unreacted ethylene oxide. It is of course possible to add a suitable amount of the organic liquid medium to the flushed reaction mixture so as to adjust the concentration of the organic liquid medium to the value specified in (b) above.

The unreacted ethylene oxide and the inert organic liquid medium may be removed to the predetermined amounts by contacting the feed reaction mixture with an inert gas, for example, nitrogen, a gaseous hydrocarbon such as methane or ethane, helium, neon, or argon. A combination of the flushing operation and the introduction of the inert gas may also be used in the present invention.

Any medium described in (1)–(b) above can be used as inert organic liquid medium used for producing the BHET-containing reaction mixture by the ethylene oxide process or an inert organic liquid medium to be added to the reaction mixture not containing such a medium. Examples of such organic liquid medium include aromatic hydrocarbons such as benzene, toluene, or xylene, halogenated hydrocarbons such as chlorobenzene, carbon tetrachloride, or chloroform, aliphatic hydrocarbons such as pentane or hexane, alicyclic hydrocarbons such as cyclohexane or Tetralin, ethers such as diethyl ether, isopropyl ether, dioxane, or tetrahydrofuran, and ketones such as acetone, methyl ethyl ketone or cyclohexanone, these compounds being stable at 80–180° C., preferably 90–150° C., more preferably 90–130° C., and being volatile. These inert organic liquid media can be easily driven off from the feed reaction mixture together with unreacted ethylene oxide by the above-mentioned flushing and the introduction of the inert gas either alone or together so that the concentrations of unreacted ethylene oxide and the inert organic liquid medium can be adjusted to the values specified in (a) and (b) above.

The inert organic liquid medium mentioned above can be driven off from the feed reaction mixture by a suitable means such as evaporation at normal atmospheric pressure or at elevated or reduced pressure or evaporation based on the formation of an azeotrope by addition of another inert organic medium.

When the feed reaction mixture containing unreacted ethylene oxide is maintained at a relatively high temperature while the BHET contained in the mixture is maintained in the molten state, the viscosity of the reaction product rises rapidly, and the product meets with difficulty in passing pipings, until finally it forms a complete mass which may block the pipings or remain in the reservoir. For this reason, post-treatment of the reaction mixture such as the separation of unreacted terephthalic acid becomes extremely difficult or impossible, and the production of bis-($\beta$-hydroxyethyl) terephthalate becomes virtually impossible.

Extensive work has been done to eliminate this drawback. As a result, it has been found that the cause of this is the formation of oligomers consisting mainly of di-, tri-, and tetramers of BHET, and that the oligomerization of BHET is closely related to the amount of ethylene oxide. It has been ascertained that by adjusting the amount of unreacted ethylene oxide contained in the reaction mixture to less than 2% by weight, preferably less than 1.5% by weight, more preferably less than 1% by weight, based on the BHET contained in the mixture, the oligomerization of the BHET can be effectively prevented and as a result the reaction mixture can be maintained relatively stable for prolonged periods of time, and therefore such reaction mixture retains a low viscosity, and the separation of unreacted terephthalic acid can be carried out easily and in good condition. It may be interesting to add that the reaction of the oligomerization of BHET to ethylene oxide has not previously been known.

The preferred ethylene oxide concentration at which the reaction mixture can be maintained stably in the molten state has to do with the amount and type of the catalyst or its derivative present in the reaction mixture. For the same type of catalyst, it is preferred to maintain the ethylene oxide concentration at relatively smaller values within the above-specified range when the concentration of the catalyst in the reaction mixture is relatively high. If the concentration of catalyst is relatively small, the concentration of ethylene oxide may be larger.

Investigation also revealed that the concentration of the inert organic liquid medium contained in the reaction mixture also has close relation with the separating efficiency of the unreacted terephthalic acid contained therein and the ease of the separating operation. For example, if the reaction mixture contains too much organic liquid medium, the separation by filtration becomes more difficult, and the filtration of the unreacted terephthalic acid becomes hardly possible at a filtration pressure of 5–10 kg./cm.$^2$G or higher until finally BHET and unreacted terephthalic acid together form a mass. This fact is quite unexpected since it is usually assumed that the dilution of the reaction mixture with an inert organic liquid medium would render the separation of unreacted terephthalic acid (for example, by filtration) suspended as solid in the reaction mixture easy.

It has been found that when the content of the inert organic liquid medium contained in the reaction mixture is reduced and adjusted to 1–100% by weight based on the BHET, unreacted terephthalic acid can be smoothly separated at a filtration pressure as low as about 1–2 kg./cm.$^2$G.

If the content of the inert liquid medium is lower than 1% by weight based on BHET, the viscosity of the reaction mixture gradually increases, and the separation of terephthalic acid by such an operation as filtration. The suitable amount (concentration) of the inert organic liquid medium to be incorporated into the reaction mixture varies according to the temperature of the reaction mixture, the type of the medium, the amount of the catalyst (or its derivative), the concentration of ethylene oxide, and so on, but generally, the preferred amount is 2–50% by weight based on BHET contained in the reaction mixture.

The most preferred embodiment is to perform the separating operation under the conditions (a) and (b) using an aromatic hydrocarbon such as benzene, toluene, or xylene as the liquid medium. By this, the separating operation is performed smoothly, with a large rate of recovering terephthalic acid and very little loss of BHET. Furthermore, by this operation, bis-(β-hydroxyethyl) terephthalate of good quality with reduced contents of byproducts such as diethylene glycol or the oligomers of BHET and with little coloration can be recovered.

(2) Separation of unreacted terephthalic acid

In the separating procedure according to the method of the present invention, the inert organic liquid medium may be added prior to effecting the separation of terephthalic acid or may be included in the reaction product between terephthalic acid and ethylene oxide. Where the reaction of terephthalic acid with ethylene oxide is performed in a liquid medium, it is preferred to separate unreacted terephthalic acid without completely removing the liquid medium from the reaction mixture rather than to first completely remove the liquid medium from the reaction mixture and then adding a fresh supply of the liquid medium.

According to the method of the present invention, the reaction mixture heated at 85–180° C., preferably 90–150° C. and adjusted to the specific ethylene oxide and inert organic medium concentrations specified in (a) and (b) above is subjected to a conventional solid-liquid separator such as a centrifugal separator or a filter, whereby molten BHET is separated from solid terephthalic acid. This separating procedure can be performed, for example, by a centrifugal precipitator, discharge-type centrifugal dehydrator, or pressurized leaf filter, either continuously or batchwise.

When a centrifugal separator is used, BHET is recovered at a filtration leakage rate (amount of solid in the filtrate/amount of filtrate) of 0.01 to 0.1%, and terephthalic is separated and recovered with a liquid content (amount of liquid contained in the cake/amount of liquid-containing cake) of 10–40%. Where a filter is used, the filtration speed is very high, and separation can be effected with good efficiency even with a small-sized filter.

The cake separated by the above-described method consists mainly of terephthalic acid, and so it can be used again for the reaction of ethylene oxide with terephthalic acid after slurrying it with a fresh liquid medium and/or ethylene oxide. In order to prevent the separated terephthalic acid wetted with BHET from recycling to the reaction system directly, the terephthalic acid cake may be washed with a liquid medium. When the recovered terephthalic acid is recycled to the reaction system, it is preferred to transport it together with an equal or larger amount of a liquid medium holding it at 80–180° C., preferably 85–150° C. in order to prevent the blockage of piping by the terephalic acid.

The invention will further be described by the following examples in which all percents and parts are by weight.

EXAMPLE 1

166 parts of crude terephthalic acid (containing as impurities 0.91% of 4-carboxybenzaldehyde and 0.23% of p-toluylic acid and 70 p.p.m. of cobalt compounds as cobalt metal, 0.05% of water, and 0.02% of other substances) obtained by liquid phase air oxidation of p-xylene, 408 parts of benzene, and 1.0 part of triethylamine were put into a mixing tank, and thoroughly agitated to form a slurry. The slurry was fed by a plunger pump and mixed with ethylene oxide fed by another pump immediately before a reaction, and the mixture was charged into the reaction. The mole ratio of the terephthalic acid to the ethylene oxide was 1:2.0. The reactor consisted of a plurality of plane stages of tubes, the stages being connected to one another in series by a curved tube and being of different heights, each of the stages consisting of a plurality of substantially straight stainless steel tubes with an inner diameter of 6 mm. arranged on a substantially horizontal plane and connected to one another in series by a curved tube. The reactor was immersed in a water tank held at 180° C.

The time of residence of the reaction mixture in the reactor was 10 minutes. The other end of the reactor was connected to a 3-liter intermediate reservoir tank and then to a flush tank via a control valve. The intermediate reservoir tank was charged with nitrogen gas at 25 kg./cm.$^2$G, and benzene and ethylene oxide were maintained liquid. The temperature of the reservoir tank was 160° C., and that of the flush tank was 110° C., while the pressure was 1.5 kg./cm.$^2$G. A greater part of benzene and unreacted ethylene oxide contained in the reaction products flushed into the flush tank was evaporated and condensed in a benzene receiving tank as a result of condensation. These formed a slurry in the mixing tank together with fresh terephthalic acid and below mentioned unreacted terephthalic acid, and recycled to the reaction system.

The non-volatile mixture remaining in the flush tank and consisting mainly of BHET and unreacted terephthalic acid had an ethylene oxide content of about 0.5% and a benzene content of about 20% both based on BHET.

The resulting non-volatile mixture consisting mainly of BHET and unreacted terephthalic acid was fed intermittently to a pressure filter to separate the unreacted terephthalic acid. The pressure filter was held at 113° C. and 1.2 kg./cm.$^2$G. The filtrate BHET was first stored in a BHET intermediate reservoir tank. By blowing $N_2$ gas, a small amount of remaining ethylene oxide was removed, and BHET was fed to a purification step. The cake that gathered in the pressure was washed with benzene heated at about 100° C., and then recycled to the reaction system. The unreacted terephthalic acid recovered by filtration was calculated from the amounts of the unreacted terephthalic acid and BHET fed to the purification step, and was found to be nearly 100%.

The residence times of BHET in the flush tank, pressure separator, and BHET intermediate reservoir were 10 minutes, 4 hours, and 3 hours, respectively, at a maximum. During this time, no blockage of pipes nor formation of masses in the flush tank was observed.

COMPARATIVE EXAMPLE 1

The procedure of Example 1 was repeated except that the amount of benzene in the slurry was changed to 332 parts, the mole ratio of ethylene oxide to terephthalic acid to be fed to the reactor was changed to 2.6:1, and the temperature of the water tank was held at 170° C. The non-volatile mixture that gathered on the flush tank became viscous, and was difficult to separate in the pressure filter. The filtration speed became extremely slow. The content of ethylene oxide in the non-volatile mixture within the flush tank was found to be 3.5%, and the benzene content was about 25%.

In about 2 hours after changing the conditions, the liquid failed to go from the flush tank to the pressure filter. Presently, the indication of the liquid level meter became unchanged in spite of an increased liquid level of the flush tank. The operation was then stopped, and the handhole of the flush tank was opened. It was found that solid matter had been deposited at the bottom to the depth of about 30% of the height of the tank. The solid matter was heated to about 150° C., but was not dissolved.

100 mg. of the solid matter were dissolved in 5 cc. of dimethyl formamide, and the quantitative analysis of the oligomers was performed by liquid chromatography. It was found to contain 30% of BHET monomer, 3% of dimer, 21% of trimer, and 50% of tetramer and oligomers of higher degree of polymerization.

EXAMPLE 2

In the same way as set forth in Example 1, 166 parts of terephthalic acid, 200 parts of ethylene oxide and 1.0 part of triethylamine were put into a mixing tank, and thoroughly mixed to form a slurry. The slurry was fed into a reactor of the same type as used in Example 1 held at 110° C. by a plunger pump. The residence time of the reaction mixture in the reactor was 30 minutes. The other end of the reactor was connected to an intermediate reservoir tank and then to a flush tank via a control valve. The intermediate reservoir was charged with nitrogen gas at 25 kg./cm.$^2$G, and ethylene oxide was maintained liquid. The reservoir tank was maintained at 110° C., and the flush tank at 115° C. and normal atmospheric pressure. A greater part of the unreacted ethylene oxide contained in the reaction product flushed to the flush tank evaporated and gathered in the ethylene oxide reservoir tank as a result of condensation. The condensed ethylene oxide was recycled to the reaction system. The non-volatile mixture remaining in the flush tank had an ethylene oxide content of about 0.2% based on BHET. To the non-volatile mixture remaining in the flush tank was added 15% by weight, based on BHET contained in it, of benzene. The mixture was fed to a pressure filter held at 113° C. and 1.2 kg./cm.$^2$G to separate terephthalic acid. The filtrate BHET was first stored in a BHET intermediate reservoir held at 115° C., and fed to a purification step.

The residence times of BHET at the flush tank, pressure separator, and the intermediate reservoir tank were respectively 10 minutes, 4 hours, and 3 hours at a maximum. The filtrate BHET had a dimer content of about 2.6% by weight. The rate of recovering unreacted terephthalic acid was nearly 100%.

COMPARATIVE EXAMPLE 2

The procedure of Example 1 was repeated except that toluene was used instead of benzene, and the temperature of the intermediate reservoir tank was changed to 120° C. The unreacted ethylene oxide and toluene did not appreciably volatilize, and a heavy liquid phase consisting mainly of BHET and unreacted terephthalic acid and a light liquid phase consisting mainly of toluene were formed in the flush tank. The heavy liquid phase had an ethylene oxide content of 1.8% by weight, and the toluene content was 120% by weight. In about one hour after the begining of filtration, the filtrate failed to come out. Even when the filtration pressure was elevated to 5 kg./cm.$^2$G and about 10 kg./cm.$^2$G respectively, the filtrate was formed only in small amounts. In about 1 hour and 45 minutes after the formation of the two liquid phases in the flush tank, the filtrate completely failed to come out. When the handhole was opened, a brown mass was found to deposit on the filter cloth. Analysis of this mass indicated that the mass contained about 15% of a dimer of BHET and about 20% of a trimer of BHET.

COMPARATIVE EXAMPLE 3

The procedure of Example 1 was repeated except that the temperature of the intermediate reservoir tank was changed to 115° C. In the reaction product reservoir tank, unreacted ethylene oxide and benzene did not appreciably volatilize in the reservoir tank, but a heavy liquid phase consisting mainly of BHET and unreacted terephthalic acid and a light liquid phase consisting mainly of benzene were formed. The heavy liquid phase contained 2.8% by weight of ethylene oxide and 150% by weight of benzene, both based on BHET. When the operation was performed in the same way as in Example 1, the separation of unreacted terephthalic acid from BHET in the presure filter failed. Even when the filtration pressure was elevated to 5 kg./cm.$^2$ and about 10 kg./cm.$^2$G, the amount of the filtrate formed was very small. In about 1 hour from the initiation of the formation of the two layers, the formation of the filtrate stopped completely. The handhole was opened, and it was found that a brown mass was formed. When this mass was analyzed, it was found to contain about 20% of a trimer of BHET and about 40% of a tetramer and oligomers of BHET of higher degrees of polymerization.

EXAMPLE 3

A electromagnetic-agitating type stainless steel autoclave was charged with 166 parts of the same terephthalic acid as used in Example 1, 106 parts of ethylene oxide, 408 parts of benzene, and 2.8 parts of triphenyl phosphine, and purged with nitrogen. Nitrogen was then introduced to a pressure of 20 kg./cm.$^2$.

The autoclave was immersed in a salt bath held at 400° C. The temperature was elevated to 180° C. over a period of about 3 minutes, and the autoclave was maintained at this temperature for 6 minutes. Then, the valve at the upper part of the autoclave was opened, when most of ethylene oxide and much of the benzene evaporated, and the temperature of the reaction mixture was reduced to 165° C. A part of the reaction mixture was sampled and its contents of ethylene oxide and benzene were measured. The contents were 0.3% by weight and 3.5% by weight respectively based on BHET. Thereafter, the autoclave was placed under a nitrogen pressure, and the reaction mixture was introduced to a pressure filter including a 1480-mesh wire gauze filter. When nitrogen at 10 kg./cm.$^2$G was continuously fed to the filter pressure, the filtration completed almost instantaneosuly, and the nitrogen gas began to pass through the filter cloth. The temperature of the filter during this time was about 165° C.

The filter was cooled, and after reducing the pressure to normal atmospheric pressure, unreacted terephthalic acid was withdrawn. The amount of the unreacted terephthalic acid was measured by washing BHET solidified together with the unreacted terephthalic acid with hot methanol. It was found that the product contained BHET in an amount about 0.6 times that of unreacted terephthalic acid. The filtrate did not contain unreacted terephthalic acid at all.

EXAMPLE 4

The procedure of Example 1 was repeated except that chlorobenzene was used instead of benzene, the mole ratio of terephthalic acid to ethylene oxide was 1:2.1, the temperature of the water bath was changed to 160° C., and the average residence time in the reactor was changed to 20 minutes. The temperature of the intermediate reservoir tank was 140° C. When the reaction mixture was flushed into the flush tank maintained at 135° C. and 3.5 kg./cm.$^2$G, a greater part of the reaction mixture gathered in the receiving tank and two liquid phases were formed. The heavy liquid phase contained 3.2% and 140%, based on the weight of BHET, of ethylene oxide and chlorobenzene.

In the same way as set forth in Example 1, the heavy liquid phase was intermittently fed to a pressure filter held at 135° C., and 3 kg./cm.$^2$G to separate the unreacted terephthalic acid continuously. After a lapse of about 30 minutes, the liquid failed to go from the flush tank to the pressure filter. The operation was stopped, and the handhole of the flush tank was opened.

The tank was full of solid matter which was not dissolved even when heated to about 190° C.

The flush tank was cleansed, and a nitrogen blow inlet was provided at the bottom of the flush tank. When the tank was operated while introducing nitrogen heated to about 160° C., the two separate phases became a uniform single phase. The liquid phase contained about 30% of chlorobenzene and about 10% of ethylene oxide. The resulting residue consisting mainly of BHET, unreacted terephthalic acid and chlorobenzene was fed to the pressure separator to separate the unreacted terephthalic acid. The subsequent operation was performed by the same way as set forth in Example 1. No trouble occurred in the flush tank and pressure filter. It was determined from the amounts of the resulting BHET and unreacted terephthalic acid that the rate of recovering the unreacted terephthalic acid was nearly 100%. The resulting BHET had a viscosity of about 20 centipoises, and contained only about 3.1% by weight of a dimer thereof.

EXAMPLE 5

An electromagnetic-agitating type stainless steel autoclave was charged with 166 parts of the same terephthalic acid as used in Example 1, 200 parts of ethylene oxide, and 2.5 parts of triethyl benzyl ammonium chloride, and after purging, nitrogen at 10 kg./cm.$^2$G was introduced. When the autoclave was immersed in a salt bath held at 400° C., the temperature rose to 130° C. in about 1 minute. The autoclave was maintained at this temperature for 30 minutes. Thereafter, while the autoclave was maintained at 110° C., the valve at the upper portion of the autoclave was opened to adjust the pressure to the atmospheric pressure. Then, the pressure was again reduced, and most of ethylene oxide was removed by evaporation. The ethylene oxide concentration in BHET was about 1.5%. The autoclave was placed under a nitrogen pressure, and introduced to a pressure filter including a 1480-mesh wire gauze filter and held at 110° C. When nitrogen at 2.0 kg./cm.$^2$G was continuously introduced into the filter, the filtration ended, and it took about 30 minutes until nitrogen gas began to pass through the filter cloth. The filter was cooled, and the pressure adjusted to normal atmospheric pressure. The unreacted terephthalic acid was withdrawn, and BHET solidified together with unreacted terephthalic acid was heated. Its amount was measured by washing with methanol. It was found that it contained BHET in an amount of 1.05 times the weight of unreacted terephthalic acid.

When in the above operation about 40%, based on the BHET, of toluene was charged into the autoclave prior to sending the reaction mixture to the pressure filter and after the reaction mixture was fully mixed with BHET, the mixture was fed to the same pressure filter, and nitrogen at 20 kg./cm.$^2$G was introduced continuously, the filtration ended in about 5 minutes, and nitrogen gas began to pass through the filter cloth.

In the same way as mentioned above, the amount of BHET solidified together with unreacted terephthalic acid was measured, and found to be 0.73 times the weight of the unreacted terephthalic acid. The filtrate did not at all contain unreacted terephthalic acid.

EXAMPLE 6

166 parts of crude terephthalic acid (containing as impurities 1.2% of 4-carboxybenzaldehyde, 0.08% of p-toluic acid, 70 p.p.m. of cobalt compounds as metal, and 0.03% of other substances), obtained by liquid phase air oxidation of p-xylene, 408 parts of benzene, and 1.0 part of triethylamine were put into a mixing tank, and thoroughly mixed under agitation to form a slurry. The slurry was fed by a plunger pump and mixed with ethylene oxide fed by another pump immediately before a reactor, and the mixture was charged into the reactor. The mole ratio of the terephthalic acid to the ethylene oxide was 1:2.0. The reactor consisted of a plurality of plane stages of tubes, the stages being connected to one another in series by a curved tube and being of different heights, each of the stages consisting of a plurality of substantially straight stainless steel tubes with an inner diameter of 6 mm. arranged on a substantially horizontal plane and connected to one another in series by a curved tube. The reactor was immersed in a water bath held at 187° C.

The mole ratio of terephthalic acid to ethylene oxide fed was 1:2.2, and the average residence time in the reactor was 10 minutes. The other end of the reactor was connected to a 3-liter intermediate reservoir tank, and then to a reaction product receiving tank via a control valve. The intermediate reservoir tank was filled with nitrogen at 25 kg./cm.$^2$G to maintain the ethylene oxide and benzene liquid. The intermediate reservoir tank was maintained at 165° C., and the reaction product receiving tank at 110° C. and 1.4 kg./cm.$^2$G. A greater part of ethylene oxide and benzene flushed to the reaction product receiving tank evaporated and gathered in a benzene receiver tank as a result of condensation. They formed a slurry together with terephthalic acid and unreacted terephthalic acid within the mixing tank, and the slurry was recycled to the reaction system. The non-volatile mixture remaining in the product receiver tank and consisting mainly of BHET and unreacted terephthalic acid contained 1.4% by weight of ethylene oxide and 20% by weight of benzene based on BHET.

The resulting residue consisting mainly of BHET, ethylene oxide, unreacted terephthalic acid and benzene was intermittently fed to a pressure filter to separate the unreacted terephthalic acid. The temperature of the pressure filter was 110° C. and its pressure was 1.2 kg./cm.$^2$G.

The cake was washed with benzene heated to 100° C., and recycled to the reaction system. No trouble occurred during the 3-month operation. The conversion of terephthalic acid was 97.5% as determined from the ratio of unreacted terephthalic acid to BHET. The rate of recovering unreacted terephthalic acid as calculated from the amounts of BHET and unreacted terephthalic acid was nearly 100%.

COMPARATIVE EXAMPLE 4

The procedure of Example 6 was repeated except that the reaction product receiver plate was maintained at 90° C. and 0.4 kg./cm.$^2$G. It was found that the residue in the receiver tank contained 0.8% by weight of ethylene oxide and 5% by weight of benzene both based on BHET. The same operation as described in Example 6 was performed while maintaining the same filter as used in Example 6 at 190° C. The filtration failed in 30 minutes after the initiation of filtration. The BHET filtrate was not obtained even if the filtration pressure was raised to 6 kg./cm.$^2$G. When a handhole was used, a colored paste-like mixture was obtained. This mixture was analyzed, and found to contain about 25% of BHET dimer.

COMPARATIVE EXAMPLE 5

The procedure of Example 6 was repeated except that the reaction product receiver tank was maintained at 110° C. and 10 kg./cm.$^2$G. As a result, the residue in the receiver tank contained 0.08% by weight of unreacted ethylene oxide and 0.5% by weight of benzene. The residue was fed to a filter held at the same temperature and pressure as set forth in Example 6. In an early stage, BHET filtrate was obtained, but with the deposition of unreacted terephthalic acid, the filtration became more and more difficult. When the same amount of unreacted terephthalic acid as set forth in Example 6 began to deposit, a small amount of unreacted terephthalic acid could be filtered out at a pressure of 10 kg./cm.$^2$G.

EXAMPLE 7

166 parts of crude terephthalic acid [containing as impurities 1.0% of 4-carboxybenzaldehyde, 0.1% of p-toluic acid, metal compounds (7800 m. of Co, 3.5 p.p.m. of Fe, 1.2 p.p.m. of Cr, 0.7 p.p.m. of Mn, 25 p.p.m. of Xi, and 0.08 p.p.m. of Mo), and 0.05% of other substances] obtained by liquid phase air oxidation of p-xylene, 408 parts of benzene, and 1.0 part of triethylamine were put in a mixing tank, and thoroughly agitated to form a suspension. The suspension was fed through a conduit by a high pressure centrifugal pump and mixed with ethylene oxide fed by another high pressure centrifugal pump immediately before the reactor, and the mixture was charged into the reactor. The reactor consisted of a plurality of plane stages of tubes, the stages being connected to one another in series by a curved tube and being of different heights, each of the stages consisting of a plurality of stainless steel cylindrical tubes having an inner diameter of 16.1 mm. and a length of 600 m. arranged substantially on a horizontal plane. The temperature was controlled by blowing steam so that the temperature of the reaction product at the outlet of the reaction tube was 183° C. or discharging steam. The mole ratio of ethylene oxide to terephthalic acid was 2:1. The average residence time of the reaction mixture in the reaction was 9.8 minutes. The outlet of the reaction tube was connected to an intermediate reservoir tank, which was then connected to a reaction product receiver tank through a control valve to control the liquid level of the reservoir tank. The pressures of the intermediate reservoir and the reaction product receiver tank were maintained respectively at 20 kg./cm.$^2$G, and 12 kg./cm.$^2$G. The temperatures were maintained respectively at 183° C., and 115° C. The reaction product was continuously flushed from the intermediate reservoir into the reaction product receiver tank. Evaporated benzene and unreacted ethylene oxide were taken out of the receiver tank so that the amount of benzene in the nonvolatile mixture remaining in the reaction product receiver tank was about 10% by weight based on BHET. A mixture of benzene and ethylene oxide was fed to a stripper. From the top of the column, a low-boiling fraction containing ethylene oxide was withdrawn, and benzene, a high-boiling fraction, was withdrawn from the bottom of the tower. The low-boiling fraction was recycled to the reaction system together with fresh ethylene oxide. A part of the high-boiling substance was used for re-slurrying liquid-containing unreacted terephthalic acid and washing the liquid-containing terephthalic acid. The remainder of the low-boiling fraction was used for slurrying fresh terephthalic acid. The gaseous low-boiling substance comprises about 60% of ethylene oxide and the amount of ethylene oxide in the high-boiling substance was about 0.1%.

The residue remaining in the reaction product receiver tank and consisting mainly of BHET, unreacted terephthalic acid, and benzene contained 1.1% by weight of ethylene oxide based on BHET. The residue were fed to a solid ball type centrifugal separator having an inner diameter of 6 inches, and length of 6 inches, and by a centrifugal effect of 2000 G, a solid mixture consisting mainly of terephthalic acid was separated from a filtrate consisting mainly of BHET. The separated solid mixture was re-slurried with benzene containing about 0.1% of ethylene oxide so that the concentration of unreacted terephthalic acid became 30% by weight, and recycled to the reaction system. At this time, an agitating tank was connected to the underside of a solid chute opening of the centrifugal separator. The amount of unreacted terephthalic acid leaked in the BHET filtrate was 0.06% and the amount of BHET contained in liquid form in the unreacted terephthalic acid was about 30%. The separator was heated by a steam conduit wound around the exterior of the separator so that the temperature in the exterior was maintained at 105° to 115° C. The pressure was maintained at 1.5 kg./cm.$^2$G same as in the receiver tank. The temperature of the unreacted terephthalic acid receiver tank was adjusted to 110° C.

The unreacted terephthalic acid and unreacted ethylene oxide were recirculated to the reaction system, and the continuous production of BHET was carried out for about one year. There was no trouble in the separator during this time.

EXAMPLES 8–13

An electromagnetic stirring type stainless steel autoclave was charged with 166 parts of terephthalic acid same as in Example 1, 200 parts of ethylene oxide, and 0.9 part of tetramethylammonium hydroxide, and after purging with nitrogen, 10 kg./cm.$^2$G of nitrogen was introduced. The autoclave was immersed in a salt bath heated to 250° C., and the temperature rose to 120° C. in about 1.5 minutes. After maintaining the autoclave at this temperature for 40 minutes, the valve at the upper part of the autoclave was opened while maintaining the inner temperature of the autoclave at 110° C. and 120° C. to evaporate ethylene oxide. The amount of remaining ethylene oxide was about 1.3% based on BHET. This mixture of BHET and unreacted terephthalic acid was mixed with each of the solvents indicated in the following table, and the mixture was fed to a pressure filter, and filtered with the introduction of nitrogen at about 5 kg./cm.$^2$G. The results as shown in the following table were obtained.

| Example | Solvents | Amount of solvent based on BHET (wt. percent) | Temperature at which terephthalic acid was separated (° C.) | Rate of recovery of terephthalic acid (percent) |
|---|---|---|---|---|
| 8 | Cyclohexane | 20 | 85 | Nearly 100%. |
| 9 | Ethanol | 5 | 110 | Do. |
| 10 | Dioxane | 45 | 170 | Do. |
| 11 | Methyl ethyl ketone | 70 | 140 | Do. |
| 12 | Methylene chloride | 90 | 100 | Do. |
| 13 | Chlorobenzene | 3 | 120 | Do. |

EXAMPLE 14

An electromagnetic stirring type stainless steel autoclave was charged with 166 parts of the same terephthalic acid as used in Example 1, 95 parts of ethylene oxide, 408 parts of xylene, and 1.0 part of triethylamine, and after purging with nitrogen, nitrogen at 20 kg./cm.$^2$G was introduced. When the autoclave was immersed in a salt bath heated, the temperature rose to about 180° C. in about 3 minutes. The autoclave was maintained at this temperature for 9 minutes. The reaction mixture was flushed into a flush tank held at 170° C. and 3 kg./cm.$^2$G. A part of the unreacted ethylene oxide and cyclohexane evaporated, and the residual liquid contained 2.9% by weight of unreacted ethylene oxide and 140% by weight of xylene both based on BHET. The residual liquid was charged into a pressure filter including a 1480-mesh wire gauze as a filter cloth and held at about 170° C. When a nitrogen pressure of 2.5 kg./cm.$^2$G was applied in order to remove unreacted terephthalic acid, the filtrate was formed initially, but gradually the speed of issuing of the filtrate became slower. In about 40 minutes, the issuing of the filtrate completely failed. Examination of the inside of the filter indicated that a red brown solid matter deposited on both sides of the filter cloth, and on it, a BHET slurry containing solid terephthalic acid accumulated.

Another flush tank was provided between the flush tank and the pressure filter, and held at 140° C. and normal atmospheric pressure. The residual liquid was flushed from the above flush tank maintained at 170° C. and 3 kg./cm.$^2$G. to the new flush tank. The residual liquid contained 1.6% by weight of ethylene oxide and 17% by weight of xylene both based on BHET. Next, the residual liquid was charged into the pressure filter maintained at about 170° C., and a nitrogen pressure of 2.0 kg./cm.$^2$G was applied. Then, a clear filtrate began to issue, and in about 7 minutes, the filtration ended, and nitrogen gas began to pass through the filter cloth.

The resulting filtrate contained about 3%, based on BHET, of a dimer of BHET, but oligomers of BHET having a higher degree of polymerization were not detected. The amount of BHET solidified together with unreacted terephthalic acid was found to be 0.8 times the weight of the unreacted terephthalic acid.

EXAMPLES 15-19

The procedure of Example 2 was repeated except that the amount of benzene to be added to the non-volatile matter remaining in the flush tank for separation of unreacted terephthalic acid was varied as shown in the following table. In order to separate unreacted terephthalic acid continuously, the filtration pressure as shown in the following table was necessary. The amount of the dimer in the filtrate is also shown in the following table. Except for the filtration pressure, the operation was the same as set forth in Example 2. Oligomers higher than the trimer were not detected.

| Example | Amount of benzene (percent by weight) | Filtration pressure (kg./cm.² G) | Amount of dimer (percent by weight) |
|---|---|---|---|
| 15 | 15 | 1.2 | 2.6 |
| 16 | 1.5 | 2-2.2 | 5.7 |
| 17 | 3 | 1.4-1.6 | 3.8 |
| 18 | 40 | 1.0-1.2 | 2.5 |
| 19 | 90 | 1.8-2.2 | 6.1 |

EXAMPLES 20-23

In Example 4, the amount of nitrogen to be blown into the flush tank and the temperature were varied, and otherwise, the operation was performed in the same way as Example 4. The amounts of ethylene oxide and chlorobenzene in the uniform liquid phase are shown in the following table. The amount of the dimer of BHET and the viscosity of the resulting BHET are also shown in the following table.

| Example N | Content of chlorobenzene (percent by weight) | Ethylene oxide content (percent by weight) | Viscosity of BHET (cp.) | Content of dimer (percent by weight) |
|---|---|---|---|---|
| 20 | Ca. 30 | Ca. 1 | Ca. 20 | Ca. 3.1 |
| 21 | Ca. 30 | 1.8 | 33 | 6.3 |
| 22 | Ca. 30 | 1.4 | 24 | 4.0 |
| 23 | Ca. 30 | 0.5 | 18 | 3.0 |

What we claim is:

1. A method of separating unreacted terephthalic acid, which comprises treating a reaction mixture containing bis-($\beta$-hydroxyethyl) terephthalate obtained by reaction of terephthalic acid with ethylene oxide, to form a suspension containing molten bis-($\beta$-hydroxyethyl) terephthalate heated at a temperature of 85° C. to 180° C. and solid unreacted terephthalic acid, in which suspension
   (a) the content of unreacted ethylene oxide is less than 2% by weight based on said bis-($\beta$-hydroxyethyl) terephthalate, and
   (b) the content of an inert organic liquid medium is 1-100% by weight based on said bis-($\beta$-hydroxyethyl) terephthalate;
   and separating the unreacted terephthalic acid from this suspension.

2. The method of claim 1, wherein the concentration of unreacted ethylene oxide is less than 1.5% by weight based on the bis-($\beta$-hydroxyethyl) terephthalate.

3. The method of claim 1, wherein the concentration of the inert organic liquid medium is 2-50% by weight based on the bis-($\beta$-hydroxyethyl) terephthalate.

4. The method of claim 1, wherein the temperature of said suspension is adjusted to 90-150° C., and terephthalic acid suspended in said suspension is separated while maintaining bis-($\beta$-hydroxyethyl) terephthalate contained in said suspension in the molten state (liquid).

5. The method of claim 1, wherein said inert organic liquid medium is selected from the group consisting of benzene, toluene, and xylene.

6. The method of claim 1, wherein the reaction of terephthalic acid and ethylene oxide is carried out in the presence of said inert organic liquid medium.

7. The method of claim 6, wherein a portion of the inert organic liquid medium utilized in the reaction of terephthalic acid with ethylene oxide is withdrawn to adjust the concentration of the inert organic liquid medium in the suspension to 1-100% by weight based on the weight of the bis-($\beta$-hydroxyethyl) terephthalate.

8. The method of claim 1, wherein the reaction of terephthalic acid and ethylene oxide is not carried out in an inert organic liquid medium and an inert organic liquid medium is added to the formed suspension to adjust the concentration of said inert organic liquid medium to 1-100% by weight based on the weight of the bis-($\beta$-hydroxyethyl) terephthalate.

References Cited

UNITED STATES PATENTS

| 3,668,235 | 6/1972 | Schekawa | 260—475 PR |
| 3,600,430 | 8/1971 | Martin et al. | 260—475 B |
| 3,576,841 | 4/1971 | Larkin | 260—475 P |

LORRAINE A. WEINBERGER, Primary Examiner

E. J. SKELLY, Assistant Examiner